(12) United States Patent
Goto

(10) Patent No.: US 6,995,316 B1
(45) Date of Patent: Feb. 7, 2006

(54) OVERMOLDED WIRE SEALING ASSEMBLY

(75) Inventor: Kazuhiro Goto, Markham (CA)

(73) Assignee: Tyco Electronics Canada, Ltd., Markham (CA)

( * ) Notice: Subject to any disclaimer, the term of this patent is extended or adjusted under 35 U.S.C. 154(b) by 0 days.

(21) Appl. No.: 10/910,997

(22) Filed: Aug. 4, 2004

(51) Int. Cl.
*H02G 3/18* (2006.01)

(52) U.S. Cl. .............................. 174/65 G; 174/153 G; 174/152 G; 248/56; 16/2.1; 16/2.2

(58) Field of Classification Search .............. 174/65 G, 174/153 G, 152 G, 72 A, 135, 153 R, 65 R, 174/142, 152 R; 248/56; 16/2.1, 2.2; 439/604, 439/587; 277/314, 330, 590, 602
See application file for complete search history.

(56) References Cited

U.S. PATENT DOCUMENTS

| | | | | |
|---|---|---|---|---|
| 3,244,802 A | * | 4/1966 | Sturtevant et al. | 174/153 G |
| 4,289,924 A | * | 9/1981 | Pearce et al. | 248/56 |
| 4,901,395 A | * | 2/1990 | Semrau | 174/153 G |
| 5,270,487 A | * | 12/1993 | Sawamura | 174/152 G |
| 5,499,823 A | * | 3/1996 | Fukui | 174/152 G |
| 5,526,549 A | * | 6/1996 | Mori et al. | 174/153 G |
| 5,834,694 A | * | 11/1998 | Bakker et al. | 174/65 G |
| 6,225,562 B1 | * | 5/2001 | Fujishita et al. | 174/152 G |
| 6,297,457 B1 | * | 10/2001 | Yamada et al. | 174/152 G |
| 6,402,155 B2 | * | 6/2002 | Sakata | 174/153 G |

* cited by examiner

*Primary Examiner*—Angel R. Estrada

(57) ABSTRACT

A wire sealing assembly provides sealing to a panel opening member with grommet housing, a wire seal, and a panel seal. The grommet housing has a cylindrical wall defining a wire receiving area. A wire alignment tab extends from the cylindrical wall into the wire receiving area and a locking projection extends outward from the cylindrical wall. One or more wires are positioned on the wire alignment tab and an overmolded wire seal is applied surrounding the wire(s) substantially filling the wire receiving area and being chemically bonded to the cylindrical wall. A panel seal is applied between the grommet hosing and a panel opening member and the locking projection serves to secure the grommet housing to the panel opening member.

12 Claims, 4 Drawing Sheets

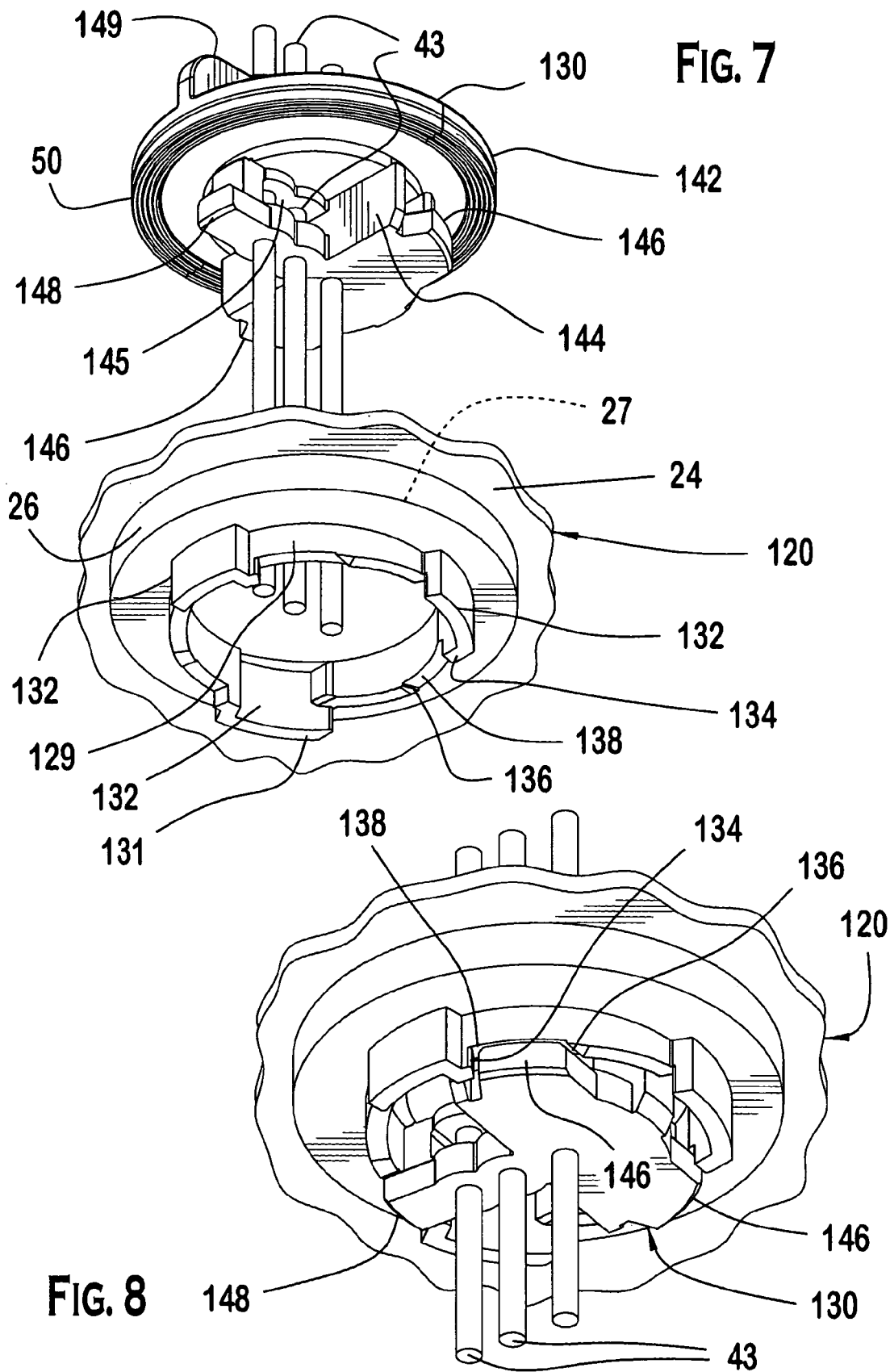

OVERMOLDED WIRE SEALING ASSEMBLY

FIELD OF THE INVENTION

The invention is related to a wire sealing assembly for sealing a wire within an opening of a sealed enclosure.

BACKGROUND

Electrical distribution systems, for example in an automotive application, may utilize a wiring harness, which is manufactured as a sub-assembly. Such a wiring harness may include a plurality of electrical connectors for receiving electrical signals and for distributing those electrical signals to various components within a system. The wiring harness may ultimately be used in applications were sealing of each electrical connector is required to meet environmental constraints. Additionally, the wiring harness may be required to pass through openings within sealed enclosures without the use of an electrical connector located between the inside and the outside of the sealed enclosure. Grommets are typically used for sealing wires within an opening for these applications. The grommet may be a split grommet which is wrapped around the wire or a plurality of wires and then compressed either by friction fit within the opening or by use of a mechanical securing device.

In certain applications, for example in a vehicle, such grommets are exposed to extreme temperature cycling which causes deterioration and loss of a seal. What is needed is an improved sealing arrangement for passing wires into or out of a sealed enclosure.

SUMMARY

A sealing assembly includes a grommet housing having a cylindrical wall defining a wire receiving area. A wire alignment tab extends from the cylindrical wall into the wire receiving area and a locking projection extends outward from the cylindrical wall. At least one wire is positioned on the wire alignment tab and an overmolded wire seal surrounds the wire substantially filling the wire receiving area and being chemically bonded to the cylindrical wall.

BRIEF DESCRIPTION OF THE DRAWINGS

The invention will now be described in greater detail with reference to the accompanying figures of which:

FIG. 7 is an exploded perspective view showing the underside of the wire sealing assembly of FIG. 5.

FIG. 8 is a perspective view similar to FIG. 7 showing the underside of an assembled wire sealing assembly.

DETAILED DESCRIPTION OF THE INVENTION

Figure 1:
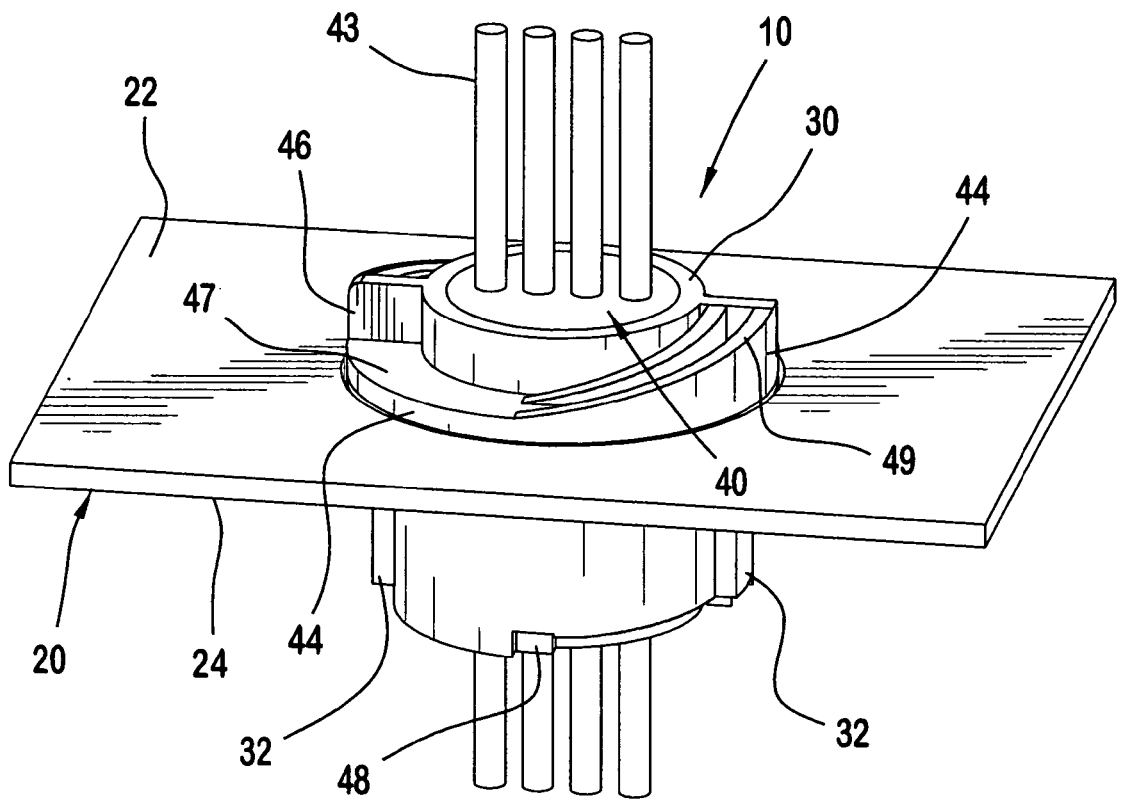
FIG. 1 is a perspective view of the wire sealing assembly according to the present invention.

FIGS. 1–4 show a first embodiment of a wire sealing assembly 10 according to the present invention having a panel opening member 20, a grommet housing 30, a wire seal 40, and a panel seal 50. Each of these major components will now be described in greater detail.

Figure 2:
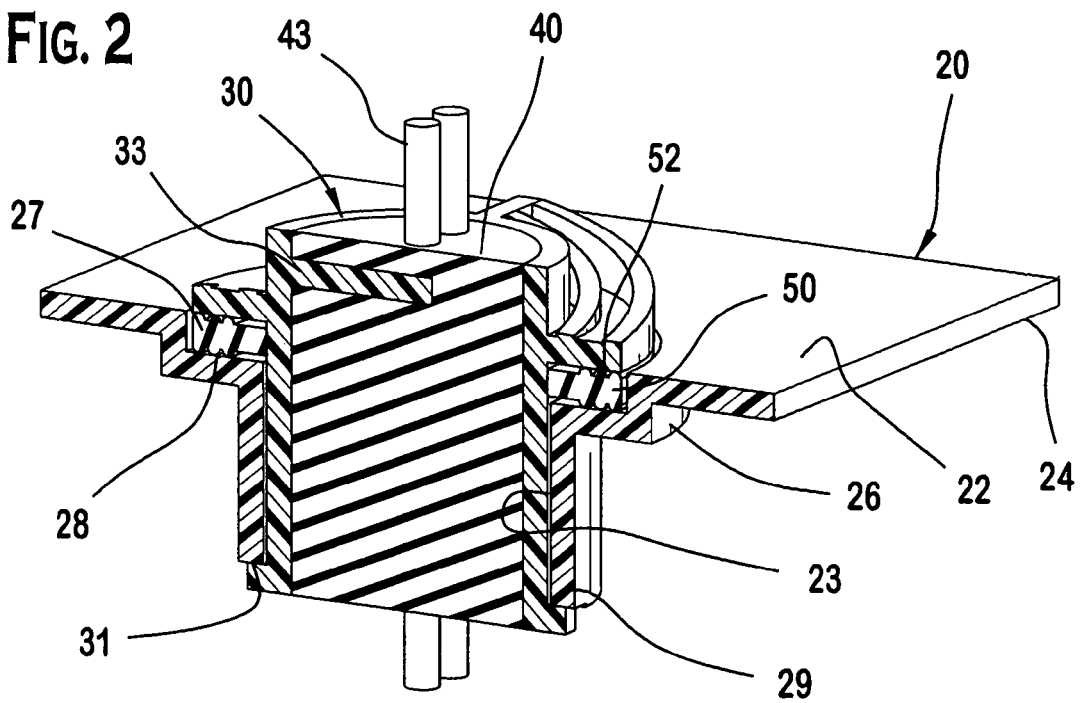
FIG. 2 is a cut away perspective view of the wire sealing assembly of FIG. 1.
Figure 3:
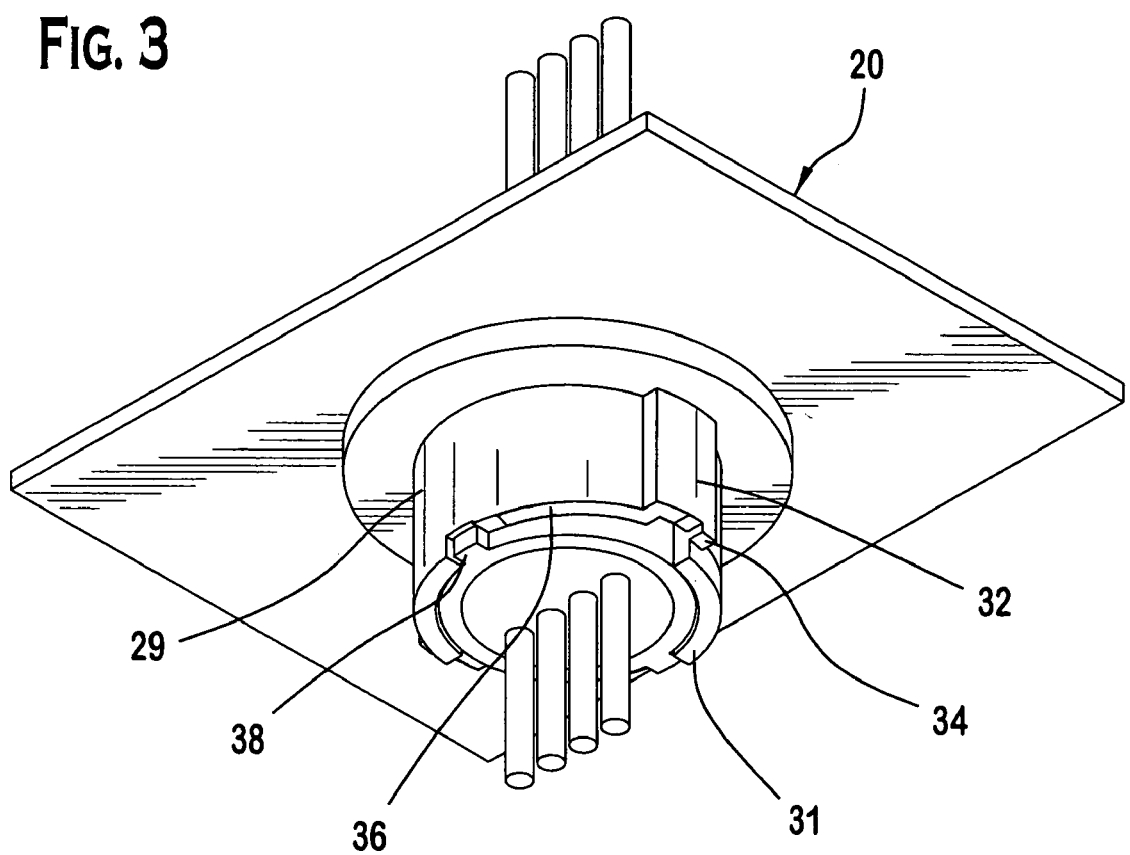
FIG. 3 is a bottom perspective view of the wire sealing assembly of FIG. 1.

Referring first to FIG. 2, the panel opening member 20 has a first panel surface 22 opposite a second panel surface 24. A shoulder 26 extends outward from the second panel surface 24 to form a peripheral recess 27. A seal engaging surface 28 extends along the peripheral recess 27 from the shoulder 26 inward to an extension wall 29. The extension wall 29 extends from the seal engaging surface 28 further outward from the second panel surface 24 to a free end 31. The shoulder 26, seal engaging surface 28 and extension wall 29 define a passageway 23. As best shown in FIG. 3, channels 32 are formed in the extension wall 29 and project outward therefrom between the seal engaging surface 28 and the free end 31. The free end 31 is profiled to have a tapered surface 36 which extends from a locking recess 38 around a portion of the free end 31 to a back stop 34 positioned near the end of the channel 32.

Figure 4:
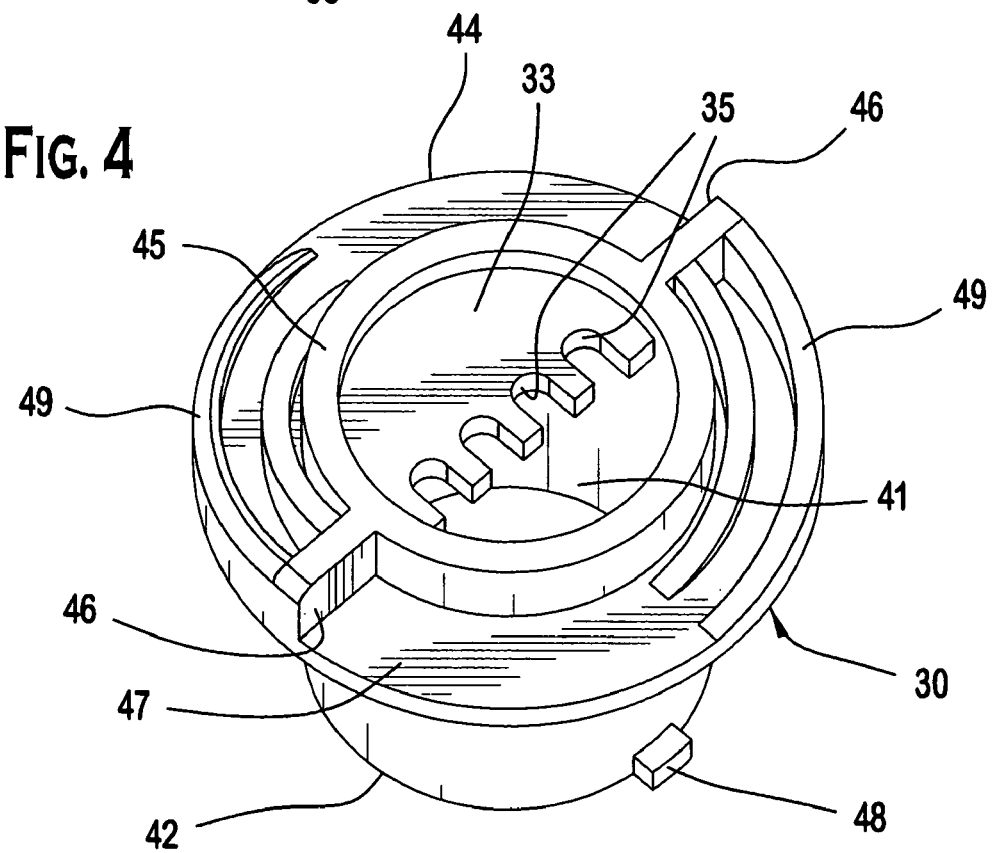
FIG. 4 is a perspective view of the grommet housing used in the wire sealing assembly of FIG. 1.

Referring now to FIG. 4, the grommet housing 30 will be described in greater detail. The grommet housing 30 is formed of an insulative material and is a generally cylindrical assembly having a cylindrical wall 42, which is sized to fit within the passageway 23. Suitable materials for the grommet housing 30 include but are not limited to Polybutylene terephthalate (PBT), polypropylene, Acrylonitrile-butadiene-styrene (ABS) or nylon. A flange 44 extends outward from the cylindrical wall 42 adjacent a first end 45. The flange 44 features a pair of actuating shoulders 46 extending upward from a top surface 47 of the flange 44. The actuating shoulders 46 are sized to be gripped by fingers or a suitable actuating tool. Behind each actuating shoulder 46 is an optional support member 49. The optional support members 49 may take various shapes but are shown in this embodiment to have a tapered top surface beginning behind the actuating shoulder 46 and extending downward to the top surface 47 of the flange 44. A wire alignment tab 33 extends inward from the cylindrical wall 42 into a wire receiving area 41. Wire receiving recesses 35 are formed along an edge of the wire alignment tab 33 and are centrally located within the wire receiving area 41. Locking projections 48 extend outward from the cylindrical wall 42 at an end opposite the flange 44 and first end 45. As best shown in FIG. 2, the wire seal 40 substantially fills the wire receiving area 41. The wire seal 40 is formed of a suitable material which is chemically bondable or otherwise secured to the inner surface of the cylindrical wall 42. A suitable material for the wire seal 40 includes but is not limited to a thermoplastic elastomer such as Santoprene. In this embodiment, the wire seal 40 is formed of a thermoplastic elastomer which is chemically bondable to the insulative material of the cylindrical wall 42, namely, PBT of the grommet housing 30. It should be understood by those skilled in the art that the thermoplastic material for the wire seal 40 is selected based on it ability to chemically bond to the insulative material of the cylindrical wall 42 and that both materials are selected based on the environmental constraints where the wire sealing assembly 10 shall be installed. The wire seal 40 is applied by an over molding process wherein it is overmolded onto wires 43 passing through the wire receiving area 41.

As shown in FIG. 2, a panel seal 50 which, in this embodiment, is formed of a silicone rubber material is applied between the under side of the flange 44 and the seal engaging surface 28. The panel seal 50 is generally circular and is sized to fit on the seal engaging surface 28. The panel seal 50 is profiled to have a series of bumps 52 formed along opposing surfaces. The bumps 52 engage the flange 44 on one side and engage the seal engaging surface 28 on the other side. The panel seal 50 is compressible between the flange 44 and seal engaging surface 28. It should be understood by those skilled in the art that although the panel seal 50 is shown in this embodiment to have a series of bumps 52 which are compressible, other seals having different constructions and being formed of alternate materials which are compressible between the flange 44 and seal engaging surface 28 may be substituted.

In assembly, wires 43 are first inserted into the wire receiving area 41. Each wire 43 is then positioned within a respective wire receiving recesses 35. Wires 43 are then overmolded to form the wire seal 40 which substantially fills the wire receiving area 41. The panel seal 50 is applied to the seal engaging surface 28. The wire and grommet housing assembly is then inserted into the panel opening member 20 such that the locking projections 48 pass through the channels 32 until they exit at the free 31 near the back stop 34. The actuating shoulders 46 are then engaged by a suitable tool or alternatively by fingers to rotate the grommet housing 30 such that the locking projection 48 rides along the tapered surface 36 and engages the locking recess 38. The panel seal 50 is compressed as the locking projections 48 move along the tapered surfaces 36 drawing the grommet housing 30 further into the panel opening member 20. In order to remove the grommet housing 30, it is first urged downward toward the free end 31 against the panel seal 50 to release the locking projections 48 from the locking recesses 38 and is then rotated back along the tapered surface 36 to the back stop 34. It may then be removed from the panel opening member 20 as the locking projections 48 pass through the channels 32.

Figure 5:
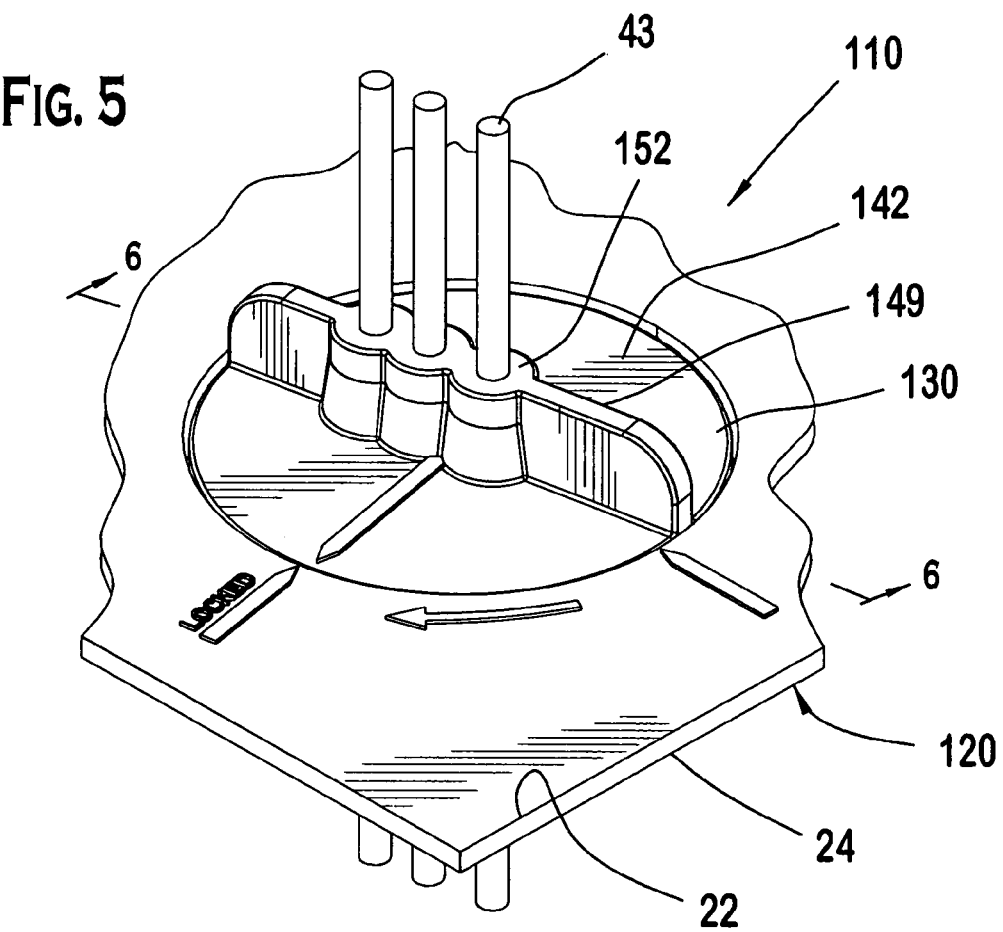
FIG. 5 is a perspective view similar to that of FIG. 1 for an alternate wire sealing assembly according to the present invention.
Figure 6:
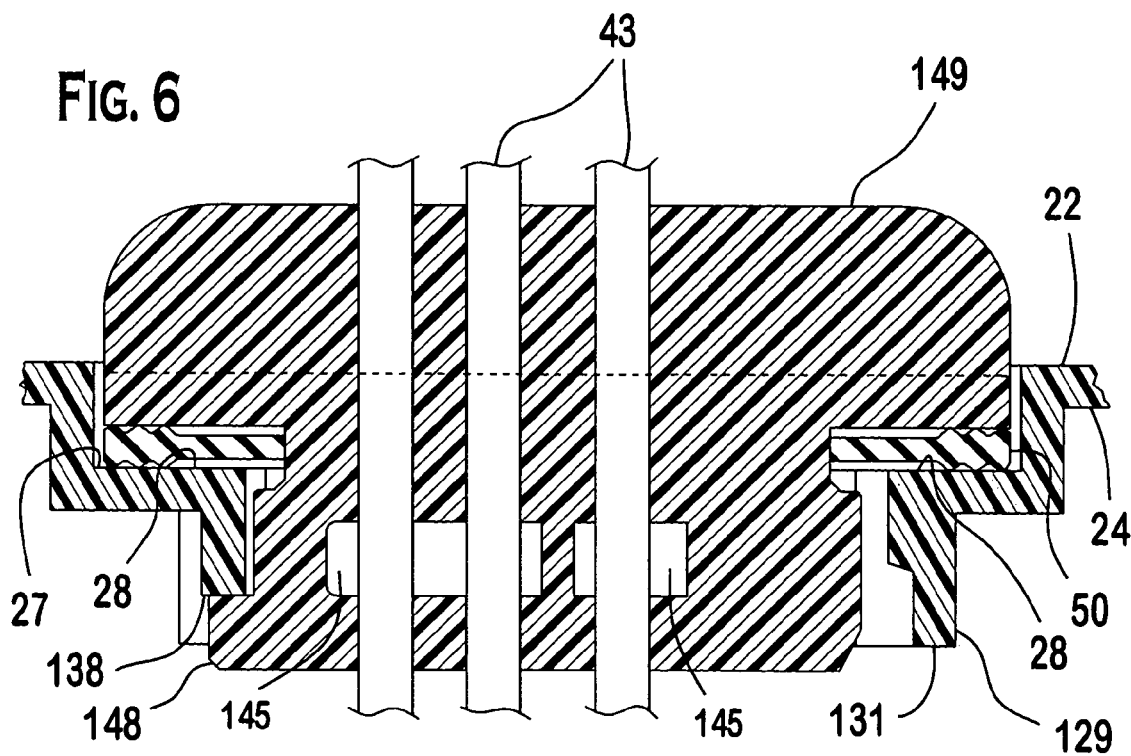
FIG. 6 is a cross sectional view taken along the line 6—6 of FIG. 5.

An alternate wire sealing assembly 110 according to the present invention will now be described with reference to FIGS. 5–8. The wire sealing assembly 110 has a panel opening member 120 and a grommet 130 which incorporates the features of the grommet housing 30 and the wire seal 40. The same panel seal 50 may be used in this alternate embodiment. Each of the major components will now be described in greater detail. Referring first to FIGS. 5, 6, and 7, the panel opening member 120 features a similar first panel surface 22 and opposite second panel surface 24. A similar shoulder 26 extends outward from the second panel surface 24 to form a similar peripheral recess 27 and seal engaging surface 28. A modified extension wall 129 extends from the seal engaging surface 28 outward from the second panel surface 24 to a free end 131. The free end 131 is profiled to have a plurality of locking recesses 138 formed adjacent tapered surfaces 136. Back stops 134 are formed adjacent each locking recesses 138. Channels 132 extend along the modified extension wall 129 and have an end located near a respective back stop 134.

The grommet 130 of this alternate embodiment is modified to eliminate the need for a separate grommet housing 30 and wire seal 40. The grommet 130 features a flange 142 which extends generally parallel to the first and second panel surfaces 22, 24. Vertical actuating shoulders 149 extend upward from the flange 142. Referring to FIG. 7, an inside vertical wall 144 extends downward from the flange 142. The inside vertical wall 144 includes first locking projections 146 extending outwardly from a central region and a second locking projection 148 also extending outward from a central region. Wires 43 are positioned within the central region. Openings 145 are also located in the central region adjacent the wires 43. A plurality of wire sealing sections 152 are integral with and located on the flange 142 to pass through both the inside vertical wall 144 and the actuating shoulders 149. These wire sealing sections 152 are formed by over molding wires 43. The first and second locking projections 146, 148 are aligned with channels 132 so that the grommet 130 may be inserted into the panel opening member 120 as will be described below. A seal 50 is similarly provided between the underside of the flange 142 and the seal engaging surface 28 within the peripheral recess 27.

In assembly, wires 43 are overmolded to form the grommet 130. Wire clamps included in the mold (not shown) hold the wires 43 in place in the vicinity of the openings 145 as molten material is flowed into a mold. After the grommet 130 is removed from the mold, the panel seal 50 is applied to seal engaging surface 28. The grommet 130 is then inserted into the panel opening member 120 such that locking projections 146, 148 pass through the channels 132 until they exit at the free ends 131. The vertical actuating shoulders 149 are then engaged to rotate the grommet 130 such that the locking projections 146, 148 ride along the tapered surfaces 136 and lock into locking recesses 138 as best shown in FIG. 8. The panel seal 50 is compressed as the locking projections 146, 148 move along the tapered surfaces 136 drawing the grommet 130 further into the panel opening member 120.

The wire sealing assembly 10, 110 advantageously provides accurate positioning of the wires 43 and an effective seal between the wires and the panel opening member 20, 120. These features result in improved sealing of the arrangement especially in harsh temperature cycling environments.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A sealing assembly comprising:
 a grommet housing having a cylindrical wall defining a wire receiving area, a wire alignment tab extending from the cylindrical wall into the wire receiving area, a locking projection extending outward from the cylindrical wall, a flange extending outward from the cylindrical wall at a first end opposite the locking projection and a pair of actuating shoulders located on the flange;
 at least one wire being positioned on the wire alignment tab;
 an overmolded wire seal surrounding the wire, substantially filling the wire receiving area, and being chemically bonded to the cylindrical wall; and,
 a panel opening member for receiving the grommet housing.

2. The sealing assembly of claim 1, further comprising a panel seal positioned along an underside of the flange.

3. The sealing assembly of claim 2, wherein the panel opening member has a shoulder extending outward from a surface thereof forming a peripheral recess.

4. The sealing assembly of claim 3, wherein the peripheral recess has a seal engaging surface for receiving the panel seal.

5. The sealing assembly of claim 4, wherein the panel opening member has an extension wall extending from the seal engaging surface further outward to a free end.

6. The sealing assembly of claim 5, wherein the free end is profiled to have a tapered surface extending from a locking recess around a portion of free end to a back stop.

7. The sealing assembly of claim 5, wherein the panel opening member has a channel formed in the extension wall.

8. A sealing assembly comprising:
   a grommet being overmolded onto at least one wire, the grommet having a flame, an inside vertical wall extending downward from the flange in a central region and a plurality of locking projections extending outwardly from the central region;
   a panel seal positioned on an underside of the flange around the central region; and,
   a panel opening member having first and second panel surfaces, a shoulder extending outward from the second panel surface to form a peripheral recess which receives the panel seal, and an extension wall extending from a seal engaging surface outward from the second panel surface to a free end.

9. The sealing assembly of claim 8, wherein the extension wall further comprises respective channels for passing each of the locking projections.

10. The sealing assembly of claim 9, wherein the free end of the extension wall is profiled to have a locking recess located along a tapered surface adjacent to a back stop.

11. The sealing assembly of claim 10, wherein the grommet has a vertical actuating shoulder extending upward from the flange opposite the vertical wall.

12. The sealing assembly of claim 11, wherein the grommet has at least one wire sealing section passing through the vertical actuating shoulder and the inside vertical wall located in the central region.

* * * * *